Feb. 22, 1927. 1,618,873
H. FRIEDMANN
DEVICE FOR TRANSPORTING THE SICK AND WOUNDED
Filed July 15, 1924
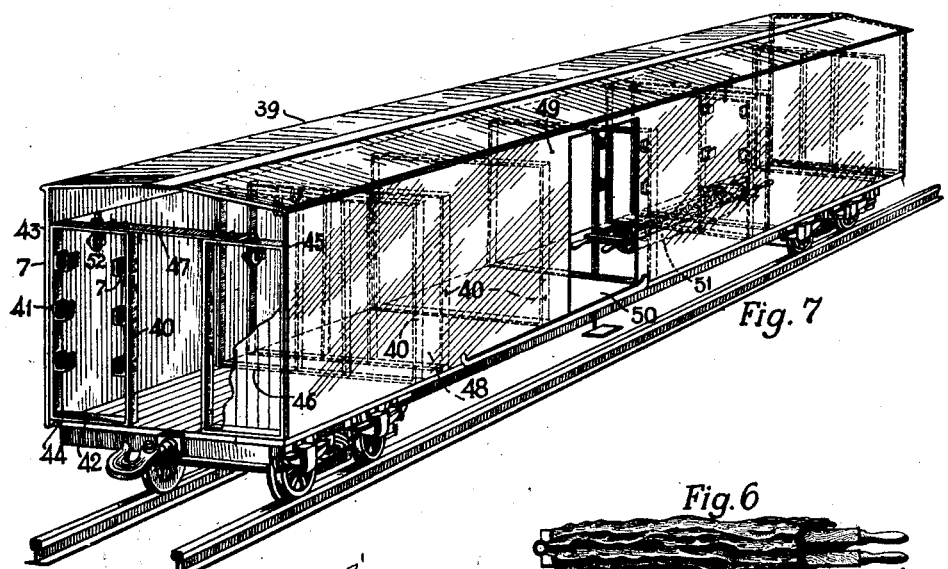
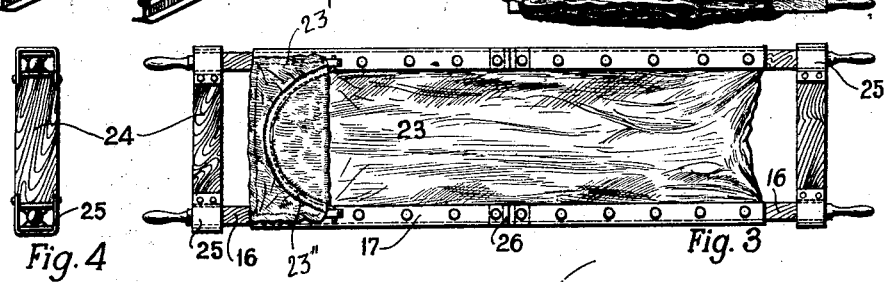
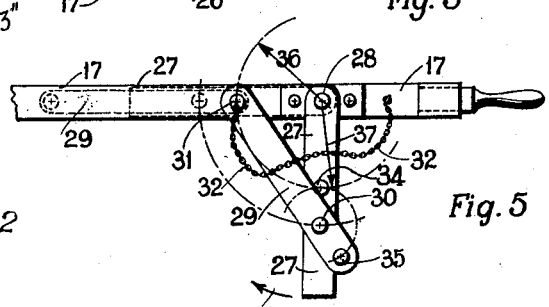
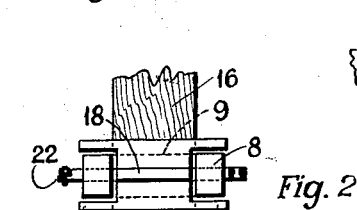
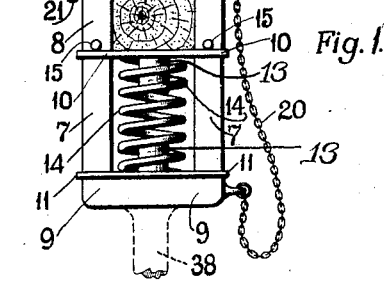
Hugo Friedmann
Inventor
By his Attorney Julian J. Wittal Patented Feb. 22, 1927.

1,618,873

UNITED STATES PATENT OFFICE.

HUGO FRIEDMANN, OF NEW YORK, N. Y., ASSIGNOR TO FRIEDMANN BROTHERS, A PARTNERSHIP, OF NEW YORK, N. Y.

DEVICE FOR TRANSPORTING THE SICK AND WOUNDED.

Application filed July 15, 1924. Serial No. 726,215.

This invention relates to appliances for transporting sick and wounded people, particularly soldiers in peace or war times, and has for its main object to provide a device of the mentioned character which it will be easy and quick to apply to and mount on almost any kind of a vehicle or conveyance used in connection with the operations and movements of an army or other military body.

Incidentally my device also aims to provide sleeping or resting accommodations to be easily applicable to any military or peace-time vehicles, or to be removed from them.

My device may be used for the accommodation of the sick and wounded and it can be detached from the vehicle to be conveniently and quickly set up in a tent, barrack, or in the open air itself, for the comfort of any person.

Other objects of my invention are: to provide a device of the mentioned character which it will be easy and inexpensive to manufacture, convenient and safe to use; which may be mounted on almost any kind of vehicle and transportation conveyance, like automobiles, trucks, wagons, carriages, railroad cars, aeroplanes, airships, steamers etc., in an extremely short time, with the greatest facility and with a few standard tools to be obtained almost anywhere; which will be adapted to be taken apart and stored in a small space in a very short time so as to enable any kind of a vehicle to carry a suitable number of such devices with it without impairing its original purpose and work, and without doing any harm to or causing any permanent changes in the construction and operation of the parts of the vehicle which is prepared for its reception in case of emergency; and which device, finally, will provide the facilities above mentioned in such a manner as to insure a safe, comfortable, shock-proof and most humane transportation of the sick and the wounded.

Other objects of my invention will be apparent as the specification of the same proceeds.

The annexed drawings and the following description set forth in detail one mechanical form embodying the invention, such detailed construction being but one of the various mechanical forms in which the principle of the invention may be used.

In the drawings:—

Fig. 1 is a front elevational view of the main element in my invention,

Fig. 2 is a top view of the same, while

Figs. 3, 4 and 5 are top, end, and fragmentary side views, respectively, of a usual stretcher bed, with certain changes and additions in its construction to suit the purposes of my invention, while Fig. 6 shows my stretcher bed as it would appear when rolled up for storage or transportation.

Fig. 7 is a somewhat diagrammatical view of a railroad freight car showing means therein to quickly and comfortably accommodate a great number of my devices for transporting sick and wounded people.

Referring now more closely to the drawings, in Figs. 1 and 2 we see a fork-like spring cushion device, indicated in general by the numeral 7, and having the two upright branches 8, 8 and the cross-base 9. Two preferably metallic plates, 10 and 11, are inserted between the branches 8—8, encircling and slidingly engaging three sides thereof, as at 12, so as to provide guiding means for themselves, each plate being provided with a centrally located integral, or firmly secured perpendicular pin or lug 13, turned opposingly towards each other and adapted to serve to guide and locate the spiral spring 14 placed between the plates 8 and urging them in outward diverging directions. The outward movement of the lower plate 11 is limited by the cross-base 9, while I may provide the easily securable split pins 15, passed laterally through the sides or uprights 8, in order to limit the upward movement of the upper plate 10, and thereby also keep the spring 14 in its place when my device is out of use. On top of the upper plate 10, I may place the suitably formed portion 16 of a stretcher pole 17 (Fig. 3), preferably slidably fitting between the upright branches 8, whereupon the pole 17 may be secured in its place by a comparatively heavy cross pin 18, placed across the portion 16 and passing through the holes 19 in uprights 8. The pin 18 may be permanently secured to the base 9 by a chain 20, ready for instant use any time needed, and I show my improved design for such pins, having a separate end portion 21 secured to the pin proper by the pivot construction 22. When passing the pin through the holes 19, the separate end portion 21 may be kept in alignment with the body of the pin 18, and thereafter dropped in a downward direction, in which position it has a tendency to remain and to thereby permanently secure the pin in position.

For every stretcher bed 17, I provide four such cushion spring fork devices 7 which devices may be secured to any kind of a vehicle in the most suitable manner and the stretcher bed secured in them. The springs 14 in the devices 7 will insure an even and smooth riding for the sick or wounded person in the bed. The movements of the bed, both upwardly and downwardly, will be executed through the springs in an elactic and gradual manner, and its downward movement limited by the compression of the springs, while upwardly the bed will be firmly secured by the pins 18.

The stretcher beds to be used with my spring cushion devices may be of any of the usual and standard makes, every one being suitable to be fitted into four such forks as described hereinbefore, but I prefer to have stretcher beds of my improved construction provided with the conveyances which are prepared for receiving sick and wounded people in cases of emergency. Such a bed is shown in the Figs. 3 to 5. This bed has the usual poles 17 and bed proper 23 secured to them and made of some textile or other flexible materials which are easy to roll up. The end portions of the poles are gripped, and the poles rigidly secured in a permanent relation as to distance, by the cross bars 24, being preferably made of wood, of a rectangular cross section and having the sheet metal end hook devices 25 adapted to slidably but firmly receive the portions 16 of poles 17. When it is desired to put the stetcher bed out of use and to store the same, the cross bars 24 may be pulled off the poles 17, the bed proper 23 rolled up around one of the poles 17 and the second pole 17 laid alongside the other one so that the whole stretcher bed occupies a small elongated cylindrical space and may be carried by the vehicle at any appropriate place of the same. In order to further reduce the space occupied by my stretcher beds when transported or stored, I also may provide the hinges 26 in its poles, about midway between their ends, the poles in this case being made of two halves connected by the hinges 26 which are of such a construction that they permit the poles to be doubled up in a downward direction but rigidly hold them in a straight line when an upward pull is exerted on their ends, as when the bed is being carried by the stretcher bearers. With the hinges 26 provided in them, the poles 17 may first be doubled up in a downward direction, (in case they are being prepared for transportation or storage,) the bed proper 23 also being doubled up in a similar manner so that the extreme ends of both, poles and bed, will come into alignment, and then the whole device may be rolled around one of the doubled poles, as has been explained above. This construction will enable a railroad car, automobile truck, or similar larger vehicle, to carry a comparatively large number of my beds in a convenient manner, occupying very little space and being ready for instant use, while any pleasure car, wagon, or other smaller conveyance may carry one or two of my improved stretcher beds without any undue discomfort to its user or interference with its normal use.

In order to make my stretcher bed available also as a normal sleeping and resting accommodation, I also may provide the same with the collapsible legs 27, pivoted to its poles near their ends as at 28, (Fig. 5). A reinforcing member 29 will keep the leg 27 in its open position, as shown by the full lines in the drawing, said member being pivoted to the leg 27 as at 30 and secured to the pole 17 by a removable pin 31, similar in construction to the one described hereinbefore in connection with the fork cushion device 7, and indicated by the character 18. Pin 31 is permanently secured to the pole 17 by a chain 32, or in any other suitable manner. Should it now be desired to use the stretcher bed without making use of its legs 27, or to roll it up, pin 31 will first be removed from the pole 17 and leg 27 turned in an upward direction, as arrow 33 indicates, until in alignment with the pole 17, as shown by the dotted lines. Reinforcing member 27 will now be brought into its dotted position, also in alignment with the pole 17, by rotating it around the pivot 30, and then the leg device secured in this collapsible position by the pin 31, passing the same through the two holes 34 and 35, provided in the leg and in the reinforcing member, respectively, and then inserting and securing said pin in the original hole in the pole 17, used for the reinforcing member 29 when the leg is in an open position and made use of. The distance 36 of the pin hole 31 from the pivotal point 28 must be the same as the distance 37 of said pivot from the hole 34, provided in the leg 27, and also the two holes 34 and 35 must be placed equidistantly from the pivotal point 30, in order to make the above described operation in collapsing and securing the leg possible.

Many ways, means and devices may be used to removably secure my spring cushions in the necessary aligned double pairs on the vehicle in question. In case of pleasure cars and other smaller automobiles, farm and military wagons, carriages and the like, I may provide a suitable extension 38 below the base 9 of the spring cushion device 7, said extension to have screw threaded ends adapted to be secured into screw threaded receiving holes, plates, and other appliances, permanently secured in advance to vehicles the use of which to my purposes has been contemplated, or rigged up thereon in case of emergency. Or the extension 38 may terminate in the form of a ring, adapted to encircle the round bar of the side of a military or farm wagon and to be secured on the same. The necessary devices for rigging up the cushions and the stretcher beds on such vehicles will be obvious and dictated by the circumstances. I, nevertheless, desire to show one construction for such purposes which I preferably want to use in case of auto trucks, railroad cars, steamers and other large conveyances, adapted to receive a large number of my stretcher beds. As an example, the railroad car 39 (Fig. 6) will be provided with co-operating pairs of upstanding frames 40 preferably made of structural steel, or other similar standard and reliable materials. Frame 40 is in the form of a right angular integral piece and its side 41 and bottom 42 are secured to the side 43 and bottom or floor 44 of the railroad car in a removable quick manner by any of the means usually applied for such purposes, like bolts and nuts. The frame 40 is of the desired and appropriate height and carries pairs of my cushion devices 7, placed opposingly and at equal heights on the inner sides of the same. Cushions 7 may be permanently secured to the frame 40 and be ready therewith, or they may be secured to the same by any appropriate means, like bolts, rivets, welding etc., at the time it is desired to set up said frames in the interior of a car, truck, steamer, and so on. The height of the frame 40 is controlled by the height of the conveyance in question, and the number of pairs of cushions 7 will be given by the possible number of tiers of beds which may be arranged in such a height. At a distance back of the first frame 40, a second frame 40 may be set up in similar manner, so that each corresponding four cushions of the two frames will be adapted to receive one stretcher bed in the manner described hereinbefore. Back of the first pair of frames further similar pairs may be arranged in as many numbers as the length of the car will permit. At the opposite side 45 of the car 39 a similar row of frames may be secured to it, leaving a suitable gangway 46 between the two rows. The corresponding pairs of frames in the two rows may be further secured and reinforced by the cross plates or bars 47 placed on the top of them and fastened to them in a removable and adjustable manner so as to make allowance for the various widths of the different vehicles, or for the various widths of gangways 46 desired between the rows of frames 40. The beds may be placed closely one after the other, or a certain lateral gangway may be left between them, as at 48. The drawing shows a cross pass 49 left at the place of the door 50 of the car, and the numeral 51 indicates, in a diagrammatic and exaggerated manner a stretcher bed in position. In order to facilitate the placing of the stretcher beds with their wounded or sick on their cushions in their respective tiers, one above the other, mechanical lifting means 52 of any usual and well known character may be provided at the top of the frames 40.

The many advantages and uses of my invention will be obvious from the above description of the same.

In order to make my collapsible stretcher bed of more comfort and usefulness, both in war and in peace time, I finally also added to the same the removable and collapsible canopy 23' the construction and use of which is obvious from Fig. 3 of the drawings. It may be attached to the head end of the bed by any of the usual means permitting its easy removal in case it is not desired to be used, or when the bed is being prepared for transportation. The front part of it is composed of the semicircular wire frame 23" which may be lifted upwards in a perpendicular position or laid down flat in its hinges at the two stretcher poles. Protecting canvas, veils and the like may be fastened to its sides, and even to its front so as to protect the user from the rays of sun, from other inclements of weather and from insects.

Having thus described my invention, what I claim as new, is:—

In a portable structure having two carrying poles, said structure, including the poles, being collapsible, to be folded into about the plane of said poles, a leg secured adjacent to each end of said poles in a pivoted manner, a bracing member to each of said legs having a permanent pivoted connection with said leg at its lower portion and being secured at its upper end to said pole by a removable pivot pin entering a hole in the pole to which the leg is attached, a hole provided in the leg at the same distance from its pivot on the pole as the distance of the removable pivot of said bracing member from said pivot of the leg on the pole, and a hole provided at the lower end of said member at the same distance from the lower permanent pivot of said bracing member as the distance of said hole in the leg therefrom, the leg and brace being movable to bring the three mentioned holes into registering position to receive said upper movable pivot pin of the bracing member whereby the leg and bracing member may be locked in alignment with the pole.

Signed at New York, in the county of New York and State of New York this 5th day of July, A. D. 1924.

HUGO FRIEDMANN.